Aug. 10, 1965     W. L. ZINGERY     3,200,330
NAVIGATION DEVICE

Filed June 7, 1962     4 Sheets-Sheet 1

*INVENTOR.*
WILBUR L. ZINGERY
BY *Sidney Magnes*

AGENT

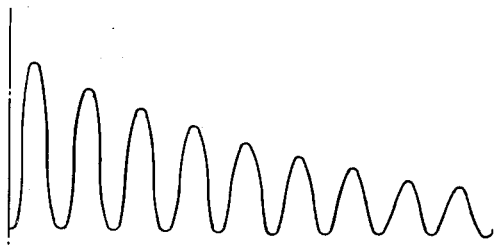
FIG. 6
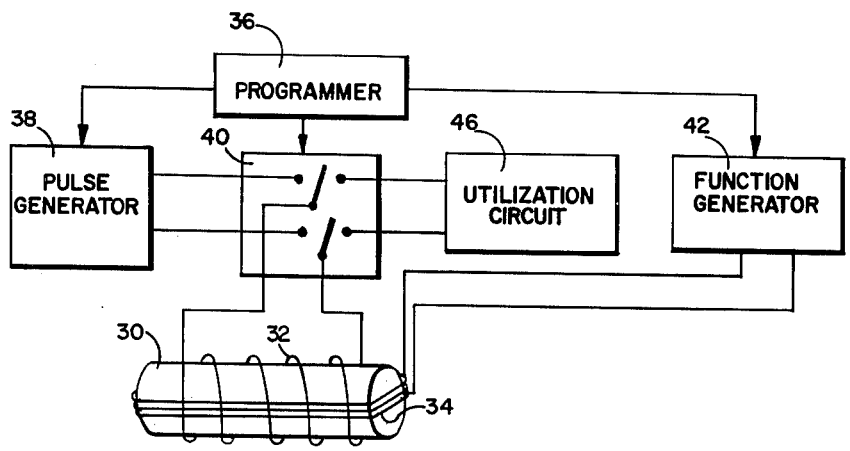
FIG. 9
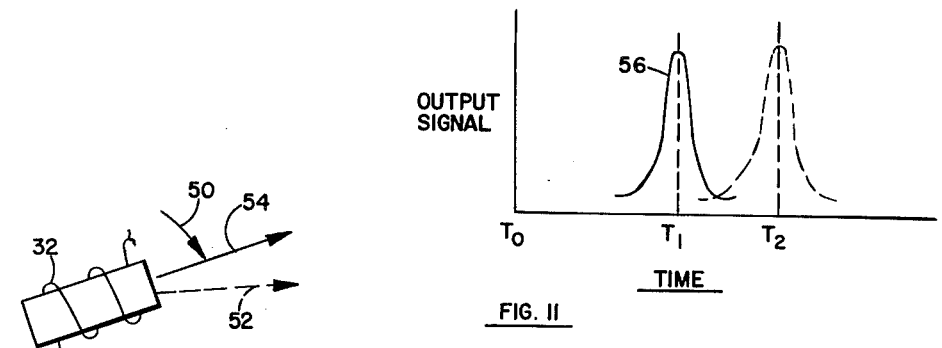
FIG. 10
FIG. 11

Aug. 10, 1965    W. L. ZINGERY    3,200,330
NAVIGATION DEVICE
Filed June 7, 1962    4 Sheets-Sheet 3

INVENTOR.
WILBUR L. ZINGERY
BY *Sidney Magnes*
AGENT

Aug. 10, 1965  W. L. ZINGERY  3,200,330
NAVIGATION DEVICE
Filed June 7, 1962  4 Sheets-Sheet 4

INVENTOR.
WILBUR L. ZINGERY

BY *Sidney Magnes*

AGENT

United States Patent Office 3,200,330
Patented Aug. 10, 1965

3,200,330
NAVIGATION DEVICE
Wilbur L. Zingery, Long Beach, Calif., assignor to
North American Aviation, Inc.
Filed June 7, 1962, Ser. No. 200,773
4 Claims. (Cl. 324—.5)

The invention relates to apparatus for indicating the heading or attitude of a vehicle, such as a ship or an airplane. More particularly, this invention is directed to a navigation device using the spin properties of the atomic nucleus of suitable materials.

In the navigation of various vehicles, it is becoming increasingly important to know, at all times, the position and heading of the vehicle. While this information is obtainable in a number of ways, it is most conveniently computed from knowledge of the ship's prior position, speed, course, and deviations from this course.

In order to obtain this information, prior-art navigation systems depended largely upon the use of gyroscopes that tend to maintain a given orientation; deviations from this orientation being measured and interpreted to provide the desired information. Generally speaking, the gyroscopic concept worked quite satisfactorily; but was afflicted with innumerable problems. These included—among others—friction at the various bearings, viscous drag on the rotating portions of the gyroscope, biasing effects produced by wires and pickups, and the necessity for computing and correcting for the resultant errors.

As may be realized, progressively increasing vehicle velocities require increasingly more precise equipment; which, in turn, has associated therewith an increasing complexity of mechanical and electronic equipment that cause the operation and spatial requirements to become progressively more severe.

At present, and even more so in the future, there is a tremendous need for a navigation device that is small, simple, reliable, and even more precise than present-day apparatus.

OBJECTS AND DRAWINGS

It is therefore the principal object of my invention to provide an improved navigation device.

It is another object of my invention to provide an improved navigation device that uses the nuclear spin property of matter.

It is another object of my invention to use the nuclear spin phenomena to indicate the change in heading of a vehicle.

The attainment of these objects and others will be realized from the following specification taken in conjunction with the drawings of which FIGURES 1 to 5, 7 and 8 are vector diagrams that explain the spin property of matter;

FIGURE 6 is a graph useful in explaining the invention;

FIGURE 9 is a schematic representation of apparatus for practicing my invention;

FIGURES 10 and 12 are diagrams useful in explaining the invention;

FIGURES 11 and 13 are vector and time relationships of the output signals;

*Introduction*

Present-day atomic theory indicates that the nucleus of each atom spins around a so-called spin axis. In certain materials, this nuclear spin has a magnetic property associated with it; this magnetic property being known as the "magnetic moment." For convenience, the magnetic moment can be represented by an arrow (i.e., a "vector"), whose direction and length indicate the orientation and strength of the magnetic moment.

The following discussion relates to materials that exhibit this magnetic property.

Ordinarily the individual magnetic moments of the multitude of nuclei of a material are randomly oriented, and as a result they tend to cancel each other. This is analogous to a piece of unmagnetized soft iron.

When these materials are placed in a "polarizing" magnetic field, a number of the nuclear magnetic moments will line up parallel to the polarizing field, and a smaller number will line up anti-parallel to the polarizing field; i.e., in the direction opposite that of the polarizing field. The unequal numbers of magnetic moments that are parallel and anti-parallel to the direction of the field; result in a "net" magnetic moment that for clarity will be called the "magnetic characteristic"; and the material is said to be polarized in a given "reference" orientation. This is analogous to magnetizing a piece of soft iron by suitably orienting its magnetic domains.

In the case of the soft iron, when the magnetizing field is removed, the individual magnetic domains revert to their random orientation; thus erasing the magnetic property. A similar effect occurs in the subject material; i.e., when the polarizing magnetic field has been removed, the individual magnetic moments of the material also revert to their random orientation, thus gradually erasing the magnetic characteristic.

The interval of time required for a material to lose its magnetic characteristic is known as the "relaxation" period; and ranges from seconds to hours, depending upon the material and conditions.

Many materials exhibit the ability to become polarized —among them are gases such as hydrogen; liquids such as water and glycerine; and solids such as paraffin—each material having its own characteristic polarization requirements, relaxation time, strength of magnetic characteristic, etc.

It has been found that when a polarized material is placed in a magnetic field that is perpendicular to the direction of polarization, the spinning nuclei "precess"; i.e. move in the same manner as the "wobbling" of a spinning top, where the upper end of the top moves in a circle.

Figure 1:
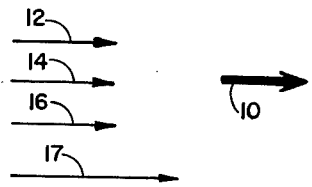

In FIGURE 1 the heavy-line arrow 10 represents the direction of a polarizing magnetic-field applied to a material. As a result of this polarizing magnetic field, a number of the individual magnetic moments 12, 14, and 16, of the material are re-oriented, so that they are aligned parallel to the polarizing field 10; and thus produce a resultant magnetic characteristic 17 that is at a reference orientation parallel to field 10.

Figure 2:
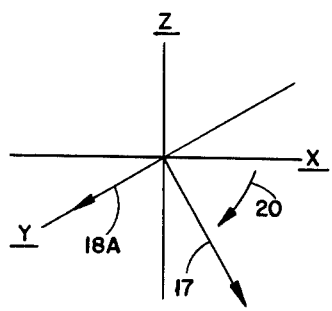

The polarizing field 10 is then removed, and a magnetic field 18A is produced perpendicular to the direction of the original polarizing field 10. As a result of the perpendicular spatial relation between magnetic field 18A and the magnetic characteristic, the magnetic characteristic 17 begins to precess in a "positive" direction. Since this is a three-dimensional concept, FIGURE 2 shows three orthogonal axes; X, Y, and Z. If the original polarizing field 10 were along the X axis, and the perpendicular field 18 were along the Y axis, then the magnetic characteristic precesses in the XZ plane, as indicated by arrow 20 of FIGURE 2.

For convenience, the perpendicular magnetic field 18 will be designated as the "precession" field.

Figure 3:
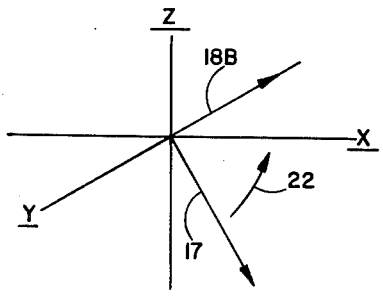

At a given time later the precession field is reversed as shown at 18B in FIGURE 3. Due to the reversal of the precession field, the precessing direction of the magnetic characteristic 17 is reversed; and it now precesses in the opposite, "negative," direction as indicated by arrow 22 of FIGURE 3.

Figure 4:
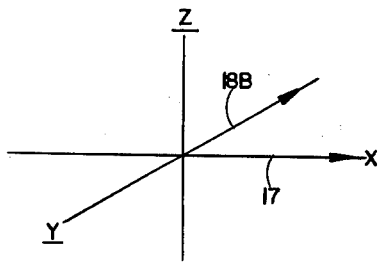

After a given interval of time, the magnetic characteristic 17 is back at its original reference orientation, as shown in FIGURE 4.

Figure 5:
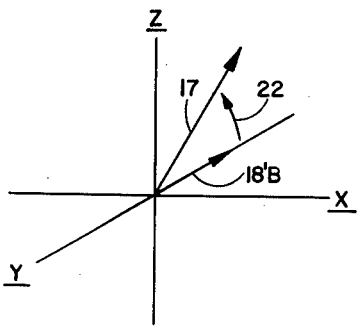

If the reversed precession field 18B is maintained, the magnetic characteristic 17 continues its negative precessing, until at a later instant it is in the position shown in FIGURE 5.

If the precession field were now reversed again so that it was as shown by 18A in FIGURE 2, the precession of the magnetic characteristic 17 would again be reversed, and it would undergo positive precession; until it is again aligned at the reference orientation shown in FIGURES 1 and 4.

In this way the magnetic characteristic 17 passes cyclically through the reference orientation.

If a pickup device, such as a coil is positioned adjacent the material, each time that the magnetic characteristic passes through a particular orientation relative to the pickup coil, an output signal is induced in the pickup coil.

It will be realized that this cyclic precession must take place within the relaxation time; else the individual magnetic moments would resume their random orientation, and lose their ability to show a magnetic characteristic, and their ability to produce an output signal.

As the individual magnetic moments undergo their precessions, the tendency to become aligned at the reference orientation becomes weaker. As a result, the strength of the output signals from the pickup device will gradually decrease, as shown in FIGURE 6.

It is therefore desirable to periodically remove the precession field, and to re-polarize the material.

The foregoing discussion has been conducted in terms of a uniform precession field, 18, that caused all of the magnetic moments 12, 14, and 16, of FIGURE 1 to precess at exactly the same rate, so that the magnetic characteristic 17 precessed at a uniform rate, and maintained a substantially constant strength. This condition is not essential, as may be seen from a consideration of the effects of a non-uniform precession field.

Figure 7:
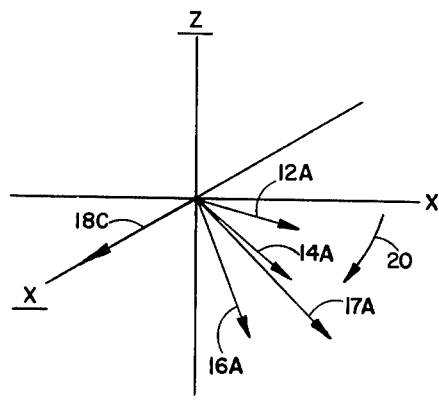

Suppose that the individual nuclear moments, such as 12A, 14A, and 16A, find themselves in different portions of a non-uniform precession field. Each of the individual nuclear moments will precess at its individual rate in the positive direction. As shown in FIGURE 7, after a given interval of time, the non-uniform precession field 18C will have caused the individual magnetic moments 12A, 14A, and 16A to have rotated through different angles in the XZ plane. As a result, they will have "fanned out"; resulting in a magnetic characteristic 17A having a somewhat smaller strength and possibly a slightly different direction than in the previous discussion.

When the non-uniform precession field is reversed, the individual nuclear moments 12A, 14A, and 16A, now precess in the negative direction at the same individual rates as before; so that they now "unfan" or cluster, and are again aligned at the reference orientation, as shown in FIGURE 4.

Figure 8:
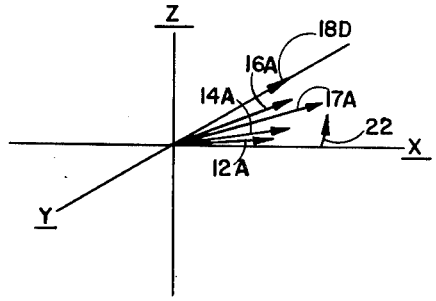

If the reversed non-uniform precession field 18D is maintained, the individual magnetic moments continue their individual rates of negative precession, and fan out on the other side of the reference orientation, as shown in FIGURE 8.

Reversing the non-uniform precession field will again reverse the direction of precession of the individual magnetic moments, and they will again become aligned as in FIGURE 4.

It may thus be seen that periodic reversals of a non-uniform precession field will cause the individual magnetic moments to periodically "cluster" at the reference orientation, and thus produce output signals.

It is thus seen that the precession field is not limited to a uniform field.

The foregoing phenomenon is, in part, covered by the term "nuclear magnetic resonance."

SYNOPSIS OF THE INVENTION

Broadly speaking, my invention contemplates a navigation device that uses the above-discussed nuclear spin characteristics of suitable materials. I apply an external magnetic field that causes the magnetic characteristic to precess in a specific manner; and a pickup device is energized by the precession of the magnetic characteristic.

When the vehicle changes its heading or attitude, the spatial relation between the magnetic characteristic and the pickup device is changed in such a way that the signal from the pickup device indicates the change in heading. This pickup signal may then be applied to computers that compare the signal with previous signals; and thus indicate the new direction of the vehicle.

DESCRIPTION OF THE INVENTION

My basic inventive concept may be understood from FIGURE 9. Here a container 30 contains a material which, upon polarizing, exhibits a magnetic characteristic and a suitable relaxation time. Alternatively, a solid material may be used. A polarizing means, such as coil 32, produces the described magnetic characteristic.

The material in container 30 is also subjected to a precession field, such as may be produced by coil 34, which—when current passes therethrough—produces a perpendicular precession field, which has a vertical orientation for the horizontally-shown position of coil 34.

In operation, a programmer 36 activates pulse generator 38; and positions switch 40 so that current is sent thru polarizing coil 32. As previously explained, this establishes a polarizing magnetic field that aligns the magnetic moments of the material in container 30. After a given interval of time, programmer 36 disables the pulse generator 38; and causes switch 40 to be thrown in the opposite direction. Simultaneously function generator 42 is energized so that it causes a flow of current through precession coil 34 to produce a precession magnetic field that reverses periodically as described above.

The magnetic characteristic of material 30 precesses in its positive and negative direction as explained above; coil 32 now acting as a pickup coil.

Each time that the magnetic characteristic passes thru the reference orientation, the pickup coil directs an output signal to utilization device 46.

The frequency of the output signal is controlled by the polarity reversals of function generator 42.

It is important that the material in container 30 be exposed only to the polarizing field and the precession field; and therefore the entire unit is enclosed in a magnetic shielding enclosure (not shown) such as is well known in the art.

Under some conditions it may be desirable to maintain the magnetic shield at a very low, cryogenic temperature for improved magnetic shielding. In that case, the material in the container may advantageously be $He^3$, which has a relaxation time of about three hours.

Assume now that the vehicle carrying the disclosed apparatus turns slightly to the left as shown in FIGURE 10, which represents a top view. The coil 34 producing the precession field is still horizontal, so that the precession field is vertical in the same manner as it was before the vehicle turned. Since the precession is controlled by the original polarization and the vertical precession field, regardless of the vehicles movement, positive precession as shown by arrow 50 would ordinarily produce an output signal when the magnetic characteristic passed through the reference orientation shown by the dotted arrow 52.

However the pickup coil 32, which is mounted on the vehicle, has now been slightly de-positioned by the turning of the vehicle. Due to the new orientation of pickup coil 32, it produces a maximum output signal at the orientation of the magnetic characteristic indicated by arrow 54; the output signal occurring slightly sooner than if the pickup coil were in its original orientation. The time relation of the output signals is shown in FIGURE 11 wherein the output signal 56, shown by the solid line, occurs at time T1; whereas ordinarily it would have occurred at a time T2, as shown by the dotted lines, had there not been any change in the heading of the vehicle.

Figure 12:
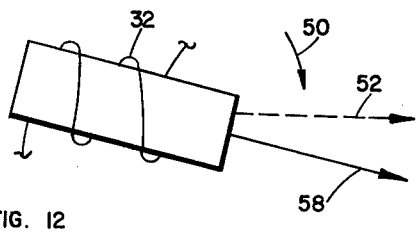

Had the vehicle turned to the right, as shown in the top view of FIGURE 12, positive precession in the direction of arrow 50 would cause the resultant output signal to be obtained at the orientation indicated by arrow 58; slightly later than it would have occurred at the orientation indicated by dotted arrow 52 had the vehicle maintained its original heading.

Figure 13:
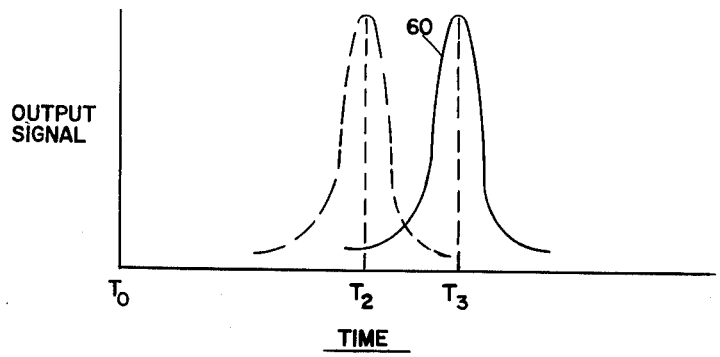

The time relation of the output signals in this case is shown in FIGURE 13, where the solid-line output signal 60 occurs at T3, a short time later than it would have occurred at time T2 had the vehicle not turned.

Since it is easy to measure the time interval T2 produced when the vehicle is moving straight ahead, any deviation measures the amount of vehicle turn, and the timing of the deviation indicates the direction of turn.

The above discussion has shown how a horizontal turn may be measured. Similar arrangements will indicate "pitch" or "roll," should these deviations be desired.

It may thus be seen that my invention causes the material to act somewhat like a "stable platform," in the sense that the magnetic characteristic of the sample retains its original precession regardless of the attitude of the vehicle carrying the equipment. When the attitude of the vehicle changes, however, the output circuit produces a signal having a different time relation, which in turn corresponds to the direction and magnitude of change of attitude.

It is a characteristic of these materials that the time required for polarization is substantially equal to the relaxation time. Thus, a material having a long relaxation time may produce output signals for a period of one or more hours; but would require an equal length of time to become polarized, during which time it would be out of service. On the other hand, a material having a short polarization time, and thus being out of service for a short time, would inherently have a short relaxation period, and thus a short period of usefulness.

It may therefore be desirable to use a plurality of units; one of which is producing output signals while one or more are being polarized.

Figure 14:
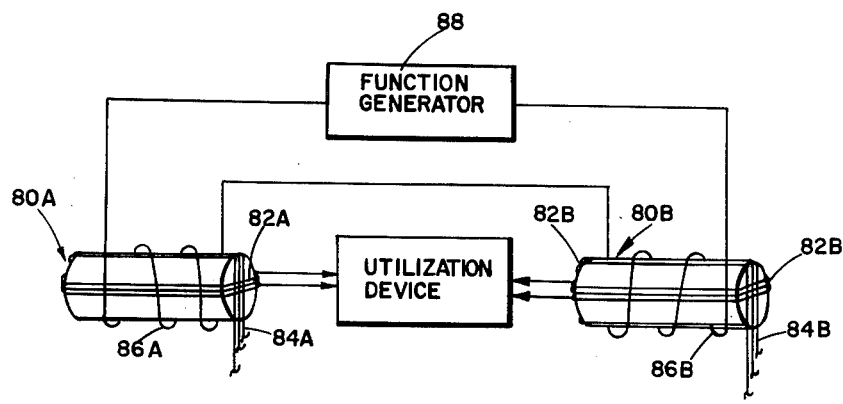
FIGURE 14 is a schematic representation of another embodiment of my invention.

FIGURE 14 shows an improved embodiment of my invention. This embodiment has two separate units, 80A and 80B, each having three separate coils; namely pickup coils 82A and 82B, polarization coils 84A and 84B; and precession coils 86A and 86B—the precession coils being connected to a function generator 88 in such a way that the precession fields have opposite orientations. This arrangement causes the magnetic characteristic of one unit to precess in a direction opposite to the precession of the magnetic characteristic in the other unit.

Figure 15:
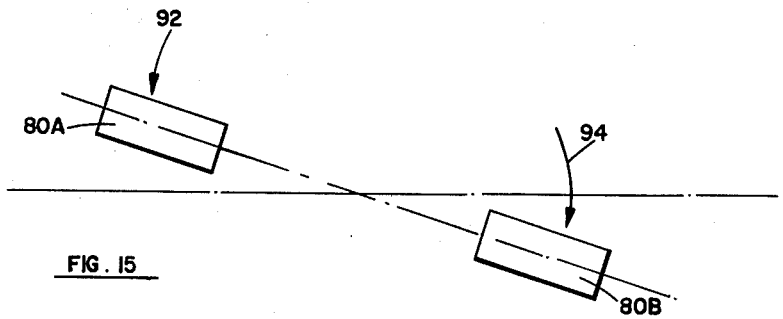
FIGURE 15 is a diagram useful in explaining the invention.

The effect of this opposite precession may be seen in FIGURE 15. Here the magnetic characteristic of the left hand unit 80A is assumed to precess in the negative direction as shown by the arrow 92; whereas the magnetic characteristic of the right hand unit 80B is assumed to be precessing in the positive direction as shown by arrow 94. As a result, when the vehicle is turned through a slight angle as shown, the sensitivity direction, and orientation of the pickup coils, and the direction of precession is such that the left hand unit produces its output signal somewhat earlier than it would have originally; while the right hand unit produces its output signal somewhat later than it would have originally.

Figure 16:
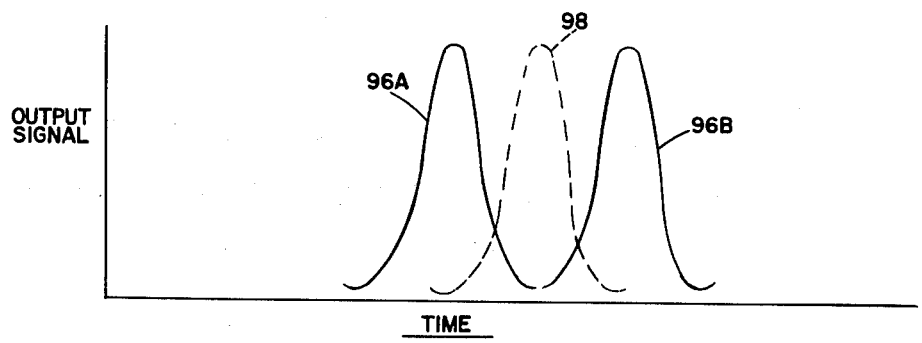
FIGURE 16 shows schematic and time relations of the output signals produced by the embodiment of FIGURE 14.

The resultant time relationship of the output signals may be seen from FIGURE 16. Here the left unit 80A produces its output signal 96A a short interval of time before the normal output signal 98 would have been produced; while the right hand unit 80B produces its output signal 96B somewhat later than output signal 98 would normally have occurred. As a result the time difference is doubled, thus making it easier to measure precise displacements. The time difference between these signals is detected by suitable circuitry, such as used in radar.

The pickup coil is preferably as close to the container as possible, in order to pickup a maximum signal. It may advantageously surround the container as shown, or be positioned in close proximity. In any case, it is attached to the vehicle so that the orientation is changed when the vehicle turns; or, alternatively, may be attached to the platform in those cases where the movement of the platform is to be detected.

Although the invention has been described and illustrated in detail, it is to be understood that the same is by way of illustration and example only and is not to be taken by way of limitation, the spirit and scope of this invention being limited only by the terms of the appended claims.

I claim:

1. Apparatus for detecting changes in the heading of a vehicle, comprising in combination:
    a first and a second similar sample of material capable of exhibiting a magnetic characteristic when polarized;
    means for polarizing said samples of material to produce a first and a second magnetic characteristic having the same reference orientation;
    means for causing said first magnetic characteristic to precess in one direction;
    means for causing said second magnetic characteristic to precess in the opposite direction;
    first pickup means for normally producing an output signal at a time when said first magnetic characteristic has a given relation to said reference orientation;
    second pickup means for normally producing an output signal at a time when said second magnetic characteristic has a given relation to said reference orientation; and
    means for causing the orientation of both said pickup means to change when said vehicle changes its heading so that said first pickup means produces a signal before said first magnetic characteristic has a given relation to said reference orientation while the other pickup means produces a signal after said second magnetic characteristic has a given relation to said reference orientation.

2. Apparatus of detecting changes in the heading of a vehicle, comprising in combination:
    a first and a second similar sample of a material capable of exhibiting a magnetic characteristic when polarized;
    means for polarizing said materials to produce a first and a second magnetic characteristic having the same reference orientation;
    means for causing said magnetic characteristics to alternately precess in opposite directions, said first and said second magnetic characteristic precessing in directions opposite to each other;
    first pickup means for producing an output signal when said first magnetic characteristic has a given relation to said first pickup means; second pickup means for producing an output signal when said second magnetic characteristic has a given relation to said second pickup means;
    means for causing the orientation of said pickup means to change when said vehicle changes its heading so that said first pickup means produces an output signal before said first magnetic characteristic has a given relation to said reference orientation while said second pickup means produces an output signal after said second magnetic characteristic has a given relation to said reference orientation.

3. Apparatus for detecting changes in the heading of a vehicle, comprising in combination:
a first and a second similar sample of a material capable of exhibiting a magnetic characteristic when polarized;
means for polarizing said material to produce a first and a second magnetic characteristic having the same reference orientation, said means comprising a pulse generator and polarizing coils surrounding each said sample of material;
means for causing said magnetic characteristic to alternately precess in opposite directions, said first and said second magnetic characteristic precessing in directions opposite to each other, said means comprising a function generator and oppositely-poled precession coils surrounding each said sample of material;
first pickup means for producing an output signal when said first magnetic characteristic has a given relation to said first pickup means;
second pickup means for producing an output signal when said second magnetic characteristic has a given relation to said second pickup means, said first and said second pickup means comprising pickup coils mounted on said vehicle to change their orientation when said vehicle changes its heading whereby one of said first pickup means produces an output signal before said first magnetic characteristic has a given relation to said reference orientation, while said second pickup means produces an output signal after said second magnetic characteristic has a given relation to said reference orientation; and
a utilization device for receiving said output signals.

4. Apparatus for detecting changes in the heading of a vehicle, comprising in combination:
a first and a second cointainer;
a first and a second similar sample of material capable of exhibiting a magnetic characteristic when polarized, positioned in respective said containers;
means for polarizing said material to produce a first and a second magnetic characteristic having the same reference orientation, said means comprising a pulse generator and polarizing coils surrounding each said container and sample of material;
means for causing said magnetic characteristic to alternately precess in opposite directions, said first and said second magnetic characteristic precessing in directions opposite to each other, said means comprising a function generator and oppositely-poled precession coils surrounding each said sample of material;
first pickup means for producing an output signal when said first magnetic characteristic has a given relation to said first pickup means;
second pickup means for producing an output signal when said second magnetic characteristic has a given relation to said second pickup means, said first and said second pickup means comprising pickup coils mounted to change their orientation when said vehicle changes its heading whereby said first pickup means produces an output signal before said first magnetic characteristic has a given relation to said reference orientation, while the said second pickup means produces an output signal after said second magnetic characteristic has a given relation to said reference orientation; and
a utilization device for receiving said output signals.

References Cited by the Examiner
UNITED STATES PATENTS

| | | | |
|---|---|---|---|
| 3,030,571 | 4/62 | Dessler | 324—0.5 |
| 3,083,335 | 3/63 | Schuster | 324—0.5 |
| 3,103,620 | 9/63 | Fraser | 324—0.5 |
| 3,103,621 | 9/63 | Fraser | 324—0.5 |
| 3,103,623 | 9/63 | Greenwood | 324—0.5 |
| 3,103,624 | 9/63 | Grunwood et al. | 324—0.5 |

OTHER REFERENCES

Heppner Journal of Geophysical Research, vol. 63, No. 2, June 1958, pages 277 to 288 incl.

Meiboom et al.: Review of Scientific Instruments, vol. 29, No. 8, August 1958, pp. 688 to 691 incl.

Burrows Journal of the British I.R.E., vol. 19, No. 12, December 1959, pp. 769 to 776 incl.

KATHLEEN H. CLAFFY, *Primary Examiner.*

CHESTER L. JUSTUS, MAYNARD R. WILBUR,
*Examiners.*